(12) United States Patent
Yang et al.

(10) Patent No.: US 10,798,802 B2
(45) Date of Patent: Oct. 6, 2020

(54) DIMMABLE LIGHTING DEVICE

(71) Applicant: SIGNIFY HOLDING B.V., Eindhoven (NL)

(72) Inventors: Eric Yang, Eindhoven (NL); Allen Zhang, Eindhoven (NL); Jeremy Jiang, Eindhoven (NL); Dunfa Chen, Eindhoven (NL); Feng He, Eindhoven (NL); Hai Tao Liu, Eindhoven (NL); Zhigang Pei, Eindhoven (NL)

(73) Assignee: SIGNIFY HOLDINGS B.V., Eindhoven (NL)

( * ) Notice: Subject to any disclaimer, the term of this patent is extended or adjusted under 35 U.S.C. 154(b) by 0 days.

(21) Appl. No.: 16/344,191

(22) PCT Filed: Oct. 26, 2017

(86) PCT No.: PCT/EP2017/077472
§ 371 (c)(1),
(2) Date: Apr. 23, 2019

(87) PCT Pub. No.: WO2018/078027
PCT Pub. Date: May 3, 2018

(65) Prior Publication Data
US 2019/0281682 A1 Sep. 12, 2019

(30) Foreign Application Priority Data
Oct. 27, 2016 (WO) ................ PCT/CN2016/103571
Dec. 1, 2016 (EP) ..................................... 16201604

(51) Int. Cl.
H05B 47/19 (2020.01)
H05B 45/10 (2020.01)
(Continued)

(52) U.S. Cl.
CPC ............. H05B 47/19 (2020.01); H05B 45/10 (2020.01); H05B 45/50 (2020.01); H05B 47/16 (2020.01)

(58) Field of Classification Search
CPC ............ H05B 37/0272; H05B 37/0281; H05B 33/0884; H05B 47/19; H05B 47/16; H05N 45/50; H05N 45/10
See application file for complete search history.

(56) References Cited

U.S. PATENT DOCUMENTS 9,609,727 B2 * 3/2017 Chen ...................... H05B 47/18
2008/0309449 A1 * 12/2008 Martin ................... H04M 11/04
340/3.1

(Continued)

FOREIGN PATENT DOCUMENTS

CN 203675391 A 6/2014
CN 203896536 U 10/2014
(Continued)

Primary Examiner — Raymond R Chai
(74) Attorney, Agent, or Firm — Daniel J. Piotrowski

(57) ABSTRACT

A lighting device (10) is disclosed comprising a light engine (12) comprising at least one solid state lighting element (11); a controller (100) for controlling a dimming level of the light engine; a wireless communication module (16) communicatively coupled to the controller for receiving a wireless dimming instruction from a wireless controller (20); and a further communication module (15) communicatively coupled to the controller for connecting to a wired communication channel and for receiving a further dimming instruction from a further controller (30) wired to the further communication module through the wired communication channel; wherein the controller is adapted to independently control the dimming level of the light engine in response to the wireless dimming instruction and the further dimming instruction.

13 Claims, 8 Drawing Sheets

(51) Int. Cl.
 *H05B 45/50* (2020.01)
 *H05B 47/16* (2020.01)

(56) References Cited

U.S. PATENT DOCUMENTS

| | | | | |
|---|---|---|---|---|
| 2011/0062896 | A1* | 3/2011 | Chou | H05B 47/18 |
| | | | | 315/362 |
| 2012/0080944 | A1* | 4/2012 | Recker | H05B 45/10 |
| | | | | 307/25 |
| 2012/0098439 | A1 | 4/2012 | Recker et al. | |
| 2012/0323394 | A1* | 12/2012 | Gandhi | H05B 47/155 |
| | | | | 700/297 |
| 2013/0214699 | A1 | 8/2013 | Jonsson | |
| 2014/0244044 | A1* | 8/2014 | Davis | G08C 17/02 |
| | | | | 700/276 |
| 2015/0108901 | A1* | 4/2015 | Greene | H05B 47/115 |
| | | | | 315/149 |
| 2015/0115801 | A1* | 4/2015 | King | H05B 477/16 |
| | | | | 315/129 |
| 2016/0120001 | A1* | 4/2016 | Clark | H05B 45/20 |
| | | | | 315/153 |

FOREIGN PATENT DOCUMENTS

| | | | | |
|---|---|---|---|---|
| CN | 104619073 | A | | 5/2015 |
| CN | 204968172 | U | | 1/2016 |
| CN | 105636322 | A | | 6/2016 |
| DE | 202016101998 | U1 | | 5/2016 |
| JP | H0487192 | A | * 3/1992 | ............ Y02B 20/46 |
| WO | 2015145287 | A1 | | 10/2015 |

* cited by examiner

200

DIMMABLE LIGHTING DEVICE

CROSS-REFERENCE TO PRIOR APPLICATIONS

This application is the U.S. National Phase application under 35 U.S.C. § 371 of International Application No. PCT/EP2017/077472, filed on Oct. 26, 2017, which claims the benefits of European Patent Application No. 16201604.2, filed on Dec. 1, 2016 and PCT/CN2016/103571, filed on Oct. 27, 2016. These applications are hereby incorporated by reference herein.

FIELD OF THE INVENTION

The present invention relates to a lighting device comprising a light engine comprising at least one solid state lighting element; a controller for controlling a dimming level of the light engine and a wireless communication module communicatively coupled to the controller for receiving a wireless dimming instruction from a wireless controller.

BACKGROUND OF THE INVENTION

Solid state lighting (SSL), e.g. LED lighting, is rapidly gaining popularity because of its energy credentials and superior lifetime compared to traditional lighting, e.g. incandescent lighting, fluorescent lighting and halogen lighting. Nevertheless, market penetration of such SSL devices is not without challenges. For example, purchase cost of SSL devices is still higher than that of equivalent traditional light sources, even though the effective cost of such SSL devices is markedly lower due to their much longer lifetime.

Another serious challenge is to provide a SSL device that offers the same functionality as such traditional light sources. For example, many users appreciate dimmable light sources, such that there is a demand for dimmable SSL-based devices. However, as such SSL-based devices may not be dimmable with existing dimmer switches, this is not straightforward. Such dimmable SSL-based devices typically need to be dimmed using suitable dimmer switches, which may be off-putting to consumers.

At the same time, the growing popularity of LED lighting has seen the advent of so-called smart lighting devices, which may form part of interconnected lighting system in which a route or hub may receive control instructions from a smart mobile communications device such as a mobile phone or a tablet computer, or alternatively from a desktop computer or laptop comprising wireless communication functionality. In this manner, a specific SSL-based device may be controlled via the route or hub using such a (mobile) communications device. However, such a solution does not offer control over stand-alone SSL-based lighting devices.

Various solutions exist for controlling stand-alone SSL-based lighting devices with a mobile communications device such as a smart phone. For example, CN 104619073 A discloses a lamp control method in which a LED lamp dimming level may be controlled using a smart phone, in which the lamp may further be switched on or off by a wireless switch and/or a mechanical switch. This provides desirable flexibility in the dimming control of the LED lamp, as the dimming is controlled with a smart phone, e.g. using an appropriate app installed on the smart phone, which smart phone may be used from any location from which it can communicate with the LED lamp. However, a smart phone can run out of battery power, which then renders the smart phone unusable until it has been sufficiently recharged. During the smart phone recharging, the LED lamp dimming level cannot be controlled, which may be unsatisfactory to the consumer.

In US Patent Application No. 2012/0098439A1, a system is disclosed which employs a control component and/or power source integrated in an LED based light source to control and/or power the LED light source wirelessly.

In US Patent Application No. 2013/0214699A1, a light emitting apparatus for controlling brightness of the apparatus is disclosed. The control of the brightness can be based on a brightness value, receiving a message over a network, and detecting a modulation of a power input of the apparatus.

SUMMARY OF THE INVENTION

The present invention seeks to provide a smart lighting device comprising a light engine comprising at least one solid state lighting element that may be dimmed in a more flexible manner.

According to an aspect, there is provided a lighting device comprising a light engine comprising at least one solid state lighting element; a controller for controlling a dimming level of the light engine; a wireless communication module communicatively coupled to the controller for receiving a wireless dimming instruction from a wireless controller; and a further communication module communicatively coupled to the controller for connecting to a wired communication channel and for receiving a further dimming instruction from a further controller wired to the further communication module through the wired communication channel; wherein the controller is adapted to independently control the dimming level of the light engine in response to the wireless dimming instruction and the further dimming instruction; wherein the controller (100) is adapted to enter a sleep mode in response to a sleep mode instruction, in said sleep mode, at least the wireless communication module or the further communication module is disabled. The wireless communication module or the further communication module typically have relatively high power consumption, so either of them can be disabled for the sake of power saving and for a flexible control of the dimmable lighting device.

In an embodiment of the present invention, said sleep mode instruction is an instruction from a user or a disruption, said disruption being one of a disruption of wireless connection to the wireless controller (20) and a disruption of a power supply. This provides the user an option to disable either of the communication modules based on a manual input, via for example a smart device. The lighting device can also be set to disable either of the communication modules based on a status change of the device, for example based on a loss of the power supply or a wireless connection disruption.

The lighting device according to embodiments of the present invention may further comprise an electric charge storage device and a power supply detector arranged to be coupled to a power supply, and the controller (100) is adapted to enter a sleep mode powered by the electric charge storage device in response to a loss of a power supply to the lighting device detected with the power supply detector, in said sleep mode, at least the wireless communication module or the further communication module is disabled. The communication modules typically have relatively high power consumption and may therefore rapidly deplete the electric charge storage device. In addition, the controller is typically adapted to disable the light engine when entering the sleep mode. This may be advantageous to ensure that the controller can complete its evaluation of the aforementioned disruption, i.e. to determine if the disruption is a dimming instruction, and store the next specified dimming level in the memory device if necessary.

The lighting device according to embodiments of the present invention may be independently dimmed using a wireless controller such as a smart phone and a wired controller such as a mechanical (wall) switch. This provides a more flexible way of dimming the lighting device, and for example provides dimming capability when the wireless controller, e.g. a smart phone, is unavailable, e.g. because the wireless controller is out of wireless communication range or because the wireless controller needs to be recharged.

The lighting device may further comprise a memory device, wherein the controller is adapted to store a specified dimming level, i.e. a dimming level based on a wireless dimming instruction received from the wireless controller or on a further dimming instruction received from the further controller, in the memory device. This may be used to restore the dimming level of the lighting device to a previously specified dimming level, e.g. upon restoring power to the lighting device.

In an embodiment, the controller is adapted to store the specified dimming level in the memory device in response to a disruption, said disruption being one of a disruption of wireless connection to the wireless controller and a disruption of a power supply. Such a disruption may be used as a trigger to store an actual dimming level, e.g. a previously specified dimming level in the memory.

Alternatively, the lighting device may further comprise a timer for timing a duration of said disruption, wherein the controller is adapted to store the specified dimming level in the memory device if said timed duration does not exceed the disruption threshold and retain a previously stored specified dimming level if said timed duration exceeds the disruption threshold. In other words, the disruption (of the wireless communication or power supply) may be interpreted as a dimming command if the disruption is reversed, e.g. the wireless communication or power supply is restored, within a defined period of time, e.g. 3 seconds.

For example, the loss of wireless connection may signal the wireless dimming instruction, and wherein the controller is adapted to alter an actual dimming level at the time of the loss of wireless connection in a defined manner to obtain the specified dimming level. Alternatively or additionally, the loss of a power supply signals the further dimming instruction, and wherein the controller is adapted to alter an actual dimming level at the time of the loss of power supply in a defined manner to obtain the specified dimming level. Such a defined manner for example may be the controller stepping through a finite state machine in which different states define different dimming levels, with each disruption recognized as a dimming instruction causing the finite state machine to step to the next state. The finite state machine may be a circular state machine, in which a scenario the finite state machine may step through a round robin of dimming states triggered by disruptions identified as dimming instructions.

The controller may be further adapted to restore the specified dimming level stored in said memory device upon restoration of said wireless connection or power supply such that a user may not have to reconfigure the lighting device, in scenarios where the previously specified dimming level is still appropriate.

In an embodiment, the controller is further adapted to, in response to receiving a further dimming instruction from the further controller, control the wireless communication module to send a synchronization instruction to the wireless controller for synchronizing dimming level information on said wireless controller with the actual dimming level set in accordance with a received further dimming instruction. In this manner, dimming level information that may be presented to the user through the wireless communication module, e.g. a smart phone or the like, may be kept up-to-date in case of a change to the dimming level with the further controller, e.g. a wall switch or the like.

The controller may be adapted to exit said sleep mode in response to an instruction from a user or a restoration of a disruption, said restoration of the disruption may be a restoration of wireless connection to the wireless controller (20) or a restoration of the power supply to the lighting device The controller may be adapted to exit said sleep mode in response to a restoration of the power supply to the lighting device detected with the power supply detector, at which stage the controller may set a dimming level of the light engine in accordance with the specified dimming level stored in the memory device.

The lighting device in at least some embodiments may be a light bulb, e.g. a LED light bulb for retrofitting in existing luminaires or electrical apparatuses or for inclusion in dedicated luminaires or electrical apparatuses, and so on.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
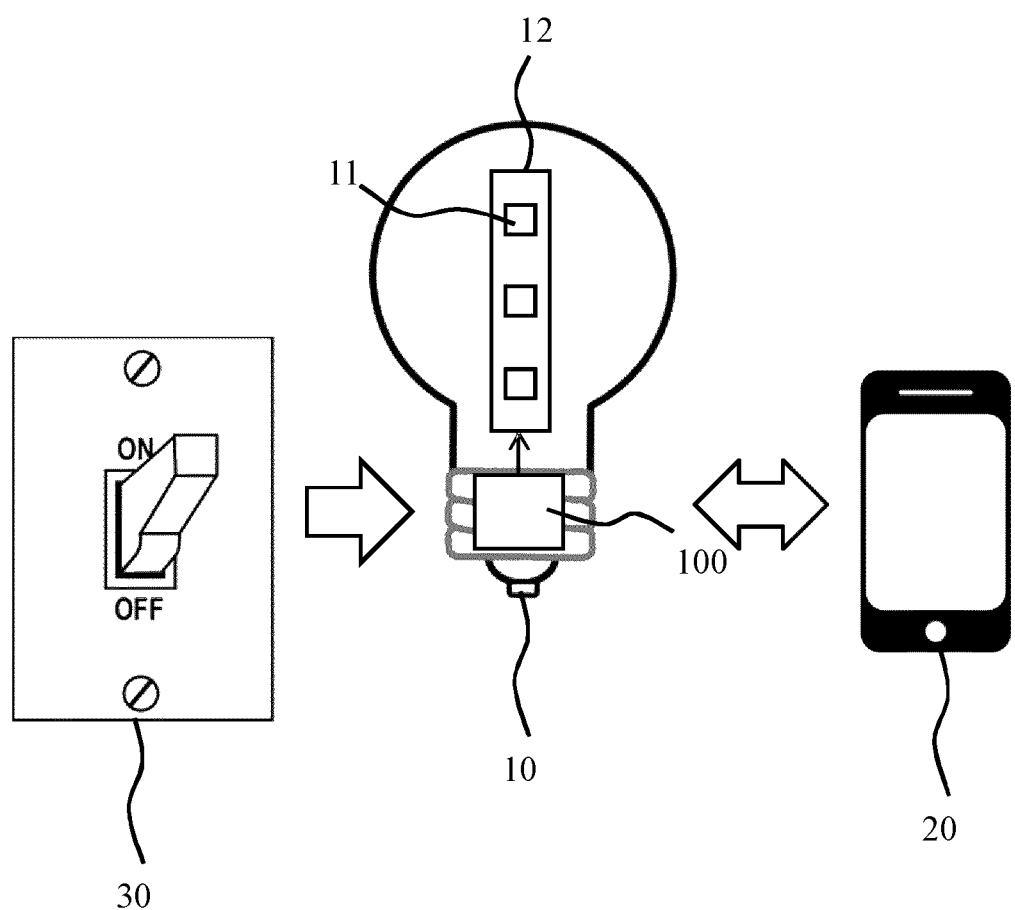
FIG. 1 schematically depicts a control arrangement including a lighting device according to an embodiment.

It should be understood that the Figures are merely schematic and are not drawn to scale. It should also be understood that the same reference numerals are used throughout the Figures to indicate the same or similar parts.

FIG. 1 schematically depicts a lighting device 10 in accordance with an embodiment of the present invention comprising a light engine 12, e.g. a carrier such as a PCB, MCPCB or the like, comprising one or more solid state lighting elements 11, e.g. one or more LEDs such as white light producing LEDs, coloured LEDs, and so on. In case of a white light producing LED, the LED may comprise one or more phosphor layers to convert the luminous output of the LED into white light, as is well-known per se. In case of a plurality of SSL elements 11 on the light engine 12, the SSL elements 11 may be identical or may be different to each other, or for example to produce a luminous having a spectral composition formed by mixing different spectral compositions produced by different SSL elements 11 of the light engine 12. The specific arrangement of SSL elements 11 is not particularly limited; any suitable arrangement using any suitable type of SSL elements 11 may be used for the light engine 12.

The light engine 12 typically is dimmable, i.e. the one or more SSL elements 11 of the light engine 12 are dimmable. To this end, the lighting device 10 further comprises a controller 100 adapted to control the one or more SSL elements 11 of the light engine 12. For example, the controller 100 may be adapted to produce a pulse width modulated (PWM) control signal for the one or more SSL elements 11 in which controller 100 adjusts the duty cycle of the PWM control signal to set a dimming level of the one or more SSL elements 11. In accordance with embodiments of the present invention, the controller 100 may independently generate a dimming control signal for the one or more SSL elements 11 in response to a dimming instruction received from a wireless controller 20 and a further controller 30 connected to the lighting device 10 in a wired manner. In other words, the wireless controller 20 and the further controller 30 may each be used independent of each other to set a dimming level of the lighting device 10.

The wireless controller 20 may be any wireless communication device capable of directly communicating with the lighting device 10 in a wireless manner. For example, the wireless communication device may be a mobile communication device such as a smart phone, a personal digital assistant, and so on. Alternatively, the wireless communication device may be a tablet computer or the like. In yet another embodiment, the wireless communication device may be a laptop computer, personal computer, or the like. The type of wireless controller 20 is not particularly limited and any suitable type of wireless controller may be used for this purpose. The wireless controller 20 may be configured to communicate wireless dimming instructions to the lighting device 10 over a wireless communication channel, for example by installation of a software program such as an app on the wireless controller 20.

The further controller 30 is typically hardwired into the lighting device 10. In a specific embodiment, the further controller 30 is a mechanical switch such as a wall switch or the like, which is capable of switching on or off the mains power supply to the lighting device 10. As will be explained in further detail below, the further controller 30 may not be able to generate a dimming control signal, e.g. a duty cycle-controlled PWM signal, for the lighting device 10, i.e. the further controller 30 may not be a dimmer switch. Instead, a dimming control signal may be generated by operating the further controller 30 in a defined manner such that the controller 100 may derive a dimming instruction from detecting the operation of the further controller 30 in this defined manner.

Figure 2:
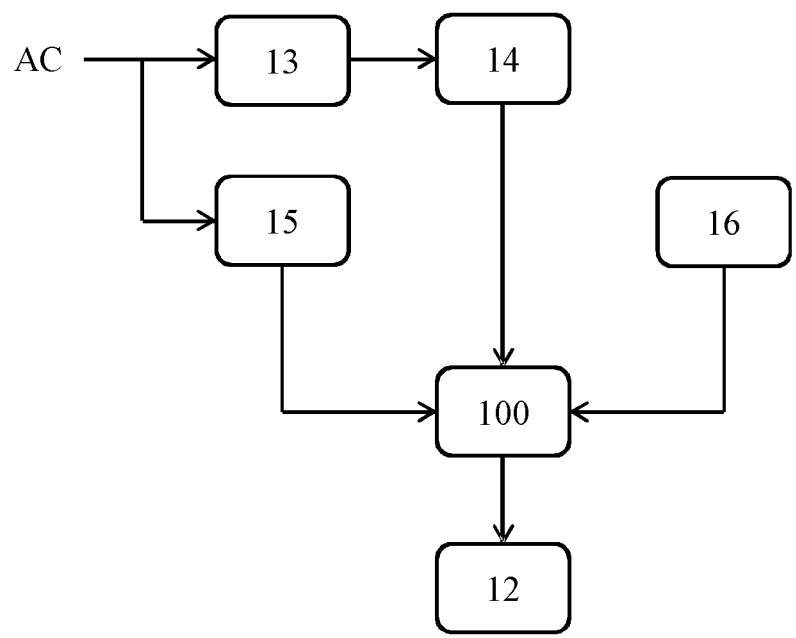
FIG. 2 schematically depicts a block diagram of a lighting device according to an embodiment.

FIG. 2 schematically depicts a block diagram of an example embodiment of the lighting device 10. For the avoidance of doubt, it should be understood that the various blocks in this block diagram depict various functions of the lighting device 10, which do not necessarily correspond to different components of the lighting device 10. Specifically, the lighting device 10 may comprise components that implement more than one function as shown in this block diagram.

The lighting device 10 may comprise a rectifier 13, which converts an incoming alternating current AC, e.g. a mains power supply passing through the further controller 30 in an enabled position, into a direct current. A power supply module 14 distributes the rectified current to various components of the light device 10, such as the controller 100 of the light engine 12.

The lighting device 10 further comprises a wireless communication module 16 under control of the controller 100 adapted to wirelessly communicate with the wireless controller 20 using any suitable wireless communication protocol. For example, the wireless communication module 16 may be a Bluetooth communication module, a Wi-Fi communication module, and so on. The wireless communication module 16 may be adapted to establish a P2P communication with the wireless controller 20, i.e. a direct communication link. Alternatively, the wireless communication module may be adapted to communicate with the wireless controller 20 through an intermediary, e.g. a hub, router, or the like.

The lighting device 10 further comprises a further communication module 15 adapted to detect a loss of power supply, i.e. a loss of the incoming alternating current AC, which may be indicative of the further controller 30 being switched to a disabled position in which the alternating current AC can no longer reach the lighting device 10. Such a further communication module 15 may be implemented in any suitable manner as will be immediately apparent to the skilled person, as the detection of the presence of a current on a wire or the like is well-known per se, such that the further communication module 15 will not be explained in further detail for the sake of brevity only.

Figure 3:
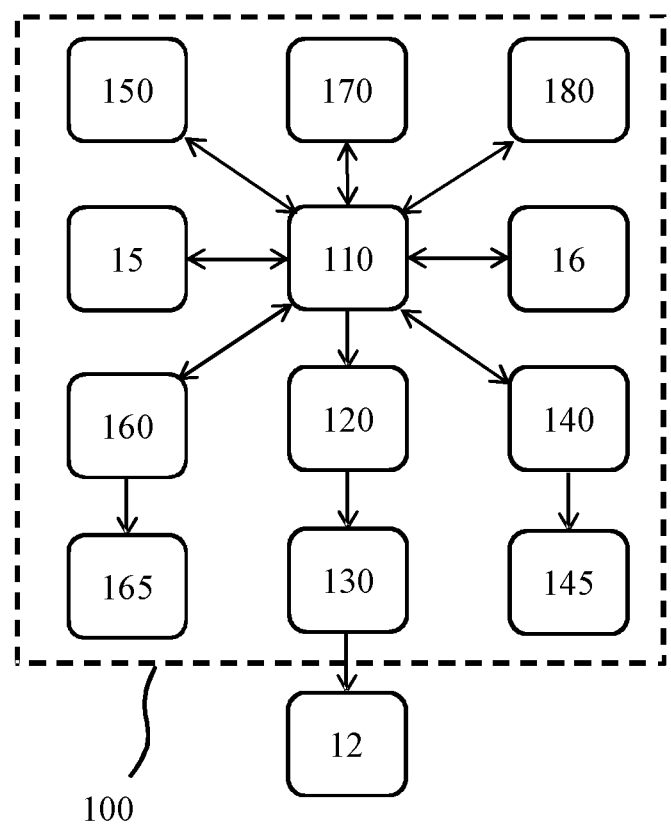
FIG. 3 schematically depicts a block diagram of an aspect of a lighting device according to an embodiment.

The controller 100 may be implemented in any suitable manner. In an example embodiment, the controller 100 may be implemented as an Application Specific Integrated Circuit (ASIC) such as a System on Chip (SoC) module. An example block diagram of such an SoC module 100 is schematically depicted in FIG. 3. In this example embodiment, the SoC module 100 comprises a central processing unit (CPU) 110 communicatively coupled to the wireless communication module 16 and the further communication module 15, here forming part of the SoC module 100 by way of non-limiting example.

The SoC module 100 further comprises a memory device 120, e.g. a static random access memory (SRAM) or the like, which may store a dimming level specified with the wireless controller 20 or the further controller 30, which specified dimming level may be used by the CPU 110, e.g. retrieved by the CPU 110 from the memory device 120 in any suitable manner, to control a driver circuit 130 of the light engine 12, e.g. a PWM control signal generation circuit, in accordance with the specified dimming level retrieved from the memory device 130.

In an embodiment, the SoC module 100 further comprises a Flash memory 145 under control of a Flash controller 140. Such a Flash memory 145 for example may be present in embodiments where the SoC module 100 must be able to store data, e.g. an actual dimming level or the like, in the absence of the mains power supply, i.e. when the further controller 30 is disabled. To enable such an embodiment, the lighting device 10, e.g. the SoC module 100, may comprise an electric charge storage device (not shown) such as a capacitor or a small battery, which electric charge storage device may be coupled to the power supply and which may provide a limited power supply in the absence of mains power to the lighting device 10. Such a limited power supply may be unable to supply the main memory device 120 with sufficient power to enable the storage of the actual dimming level of the lighting device 10 in the main memory device 120, in which case the actual dimming level may be stored in the Flash memory 145 instead, such that the CPU 110 may transfer the actual dimming level from the Flash memory 145 to the main memory device 120 upon restoration of the mains power supply to the lighting device 10. It should however be understood that alternative arrangements, e.g. arrangements in which the lighting device 10 comprises only a single memory device such as only the SRAM 120 or the Flash memory 145, may be equally contemplated.

The SoC module 100 further comprises at least one of a timer 150 and a real time clock 160 including a crystal 165. The timer 150 for example may be used to determine an amount of time that the power supply is disrupted. Alternatively, this may be determined with the real time clock 160. Similarly, the timer 150 or the real time clock 160 may be used to determine the amount of time a wireless communication between the lighting device 10 and the wireless controller 20 is disrupted, the purpose of which will be explained in more detail below. The timer 150 may form part of the further communication module 15, which module may comprise a general purpose input/output (GPIO) coupled to the power supply and adapted to detect the disruption to the power supply as previously explained.

The SoC module 100 may further comprise one or more interfaces for communicating with other devices, e.g. devices in a network of lighting devices, which network may be a wired or wireless network. By way of non-limiting example, the SoC module 100 may comprise a UART module 170 and an I²C module 180 but it will be immediately apparent to the skilled person that the SoC module 100 may comprise any suitable type and/or number of such interfaces. It should be further understood that embodiments of the lighting device 10 in which such interfaces are not included are also equally feasible.

Figure 4:
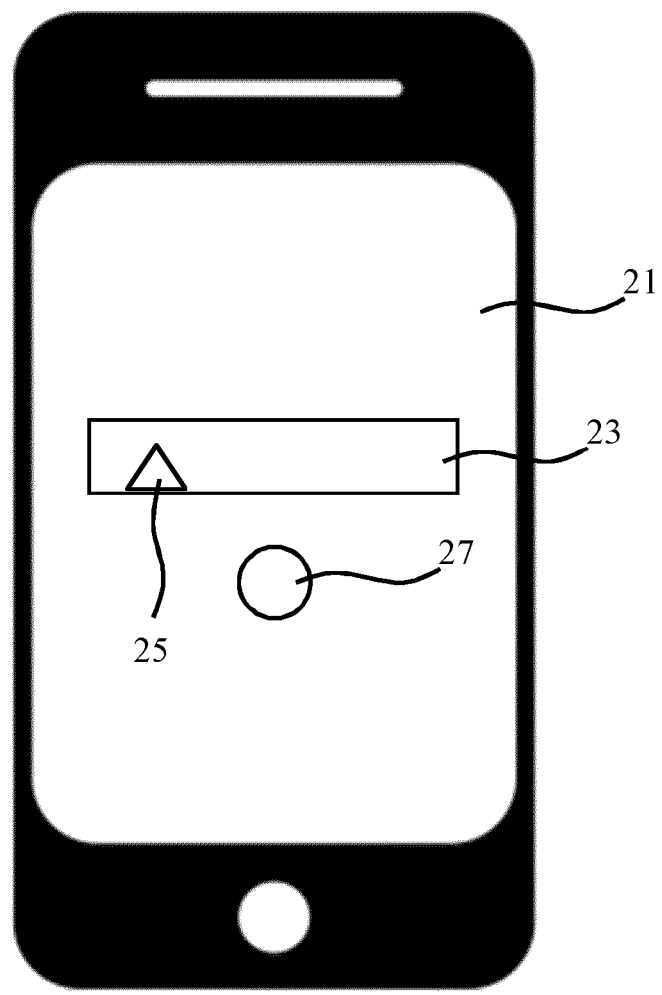
FIG. 4 schematically depicts an example embodiment of a wireless control module configured to control a lighting device according to an embodiment.

FIG. 4 schematically depicts an example embodiment of the wireless controller 20 configured to control the dimming level of the lighting device 10. The wireless controller 20 comprises a user interface 21, here a touchscreen display by way of non-limiting example, and is configured by way of a software program such as an app to display lighting device controls 23, 27 on the user interface 21 for controlling by a user of the wireless controller 20. For example, the control 23 may be a slider bar, wheel or the like representing dimming levels of the lighting device 10 including an indicator 25 having a user-adjustable position such that the user may set the dimming level of the lighting device 10 by positioning the indicator 25 at the desired dimming level on the control 23. The control 27 may be an on/off button of the lighting device 10, which may be used by the user of the wireless controller 20 to switch the lighting device 10 on or off. To this end, the lighting device 10 may comprise an internal switch (not shown) for disconnecting the power supply to at least the light engine 12. In this embodiment, the SoC module 100 may remain powered such that future user instructions, e.g. as provided by the wireless controller 20 or the further controller 30, may be successfully processed by the controller 100.

Upon the user generating such a user instruction, i.e. a dimming instruction or an on/off instruction, on the user interface 21, the wireless controller 20 communicates the user instruction to the lighting device 10 via the wireless communication module 16, which relays the received user instruction to the CPU 110, which subsequently controls the lighting device 10 in accordance with the received user instruction as will be readily understood by the person skilled in the art.

Figure 5:
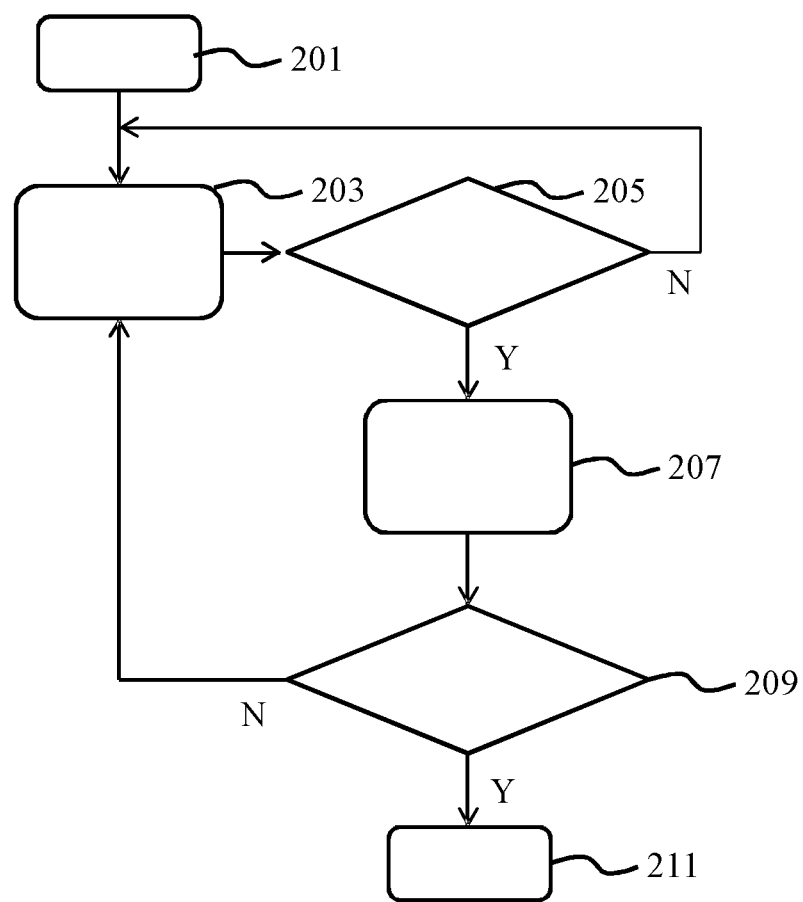
FIG. 5 is a flowchart of a control method of a lighting device according to an embodiment.

For example, in case of a dimming instruction, the CPU 110 may implement a control method 200 as depicted by the flow chart in FIG. 5. The CPU 110 may start the control of the lighting device 10 in 201, e.g. in response to a user instruction from the wireless controller 20 to switch on the lighting device 10 or in response to the power supply to the lighting device 10 being enabled by the further controller 30. The control method 200 subsequently proceeds to 203 in which the CPU 110 retrieves a default dimming level or the most recent dimming level of the lighting device 10, e.g. the most recently user-specified dimming level, from the memory device 120, and configures the driver circuit 130 of the light engine 12 in accordance with the retrieved dimming level.

Next, the CPU 110 listens to the wireless communication module 16 to determine if the user of the wireless controller 20 has specified a dimming instruction to alter a dimming level of the lighting device 10. If this is not the case, the CPU 110 continues to operate the lighting device 10 in accordance with the dimming level retrieved from the memory device 120. However, as soon as the CPU 110 detects a new dimming instruction originating from the wireless controller 20 in 205, the control method 200 proceeds to 207 in which the CPU 110 updates the memory device 120 with the received user-specified dimming level and operates the lighting device 10 in accordance with the updated specified dimming levels. It may be checked in 209 if the operation of the lighting device 10 should continue, e.g. whether a power-down instruction has been received from the wireless controller 20 or the further controller 30. If this is the case, the control method 200 may terminate in 211, otherwise the control method 200 may revert back to for example 203 in which the operation of the lighting device 10 is continued in accordance with the up-to-date dimming instructions.

In this embodiment, the user of the wireless controller 20 may be able to control the dimming levels of the lighting device 10 in a fine-grained manner, e.g. using the control 23. However, as will be explained in further detail below. It should be understood that alternative control mechanisms of the dimming level of the lighting device 10 using the wireless controller 20 may be contemplated, e.g. a control mechanism in which a dimming level is selected by a sequence of on/off instructions provided with the control 27, in which case the control 23 may be omitted.

Figure 6:
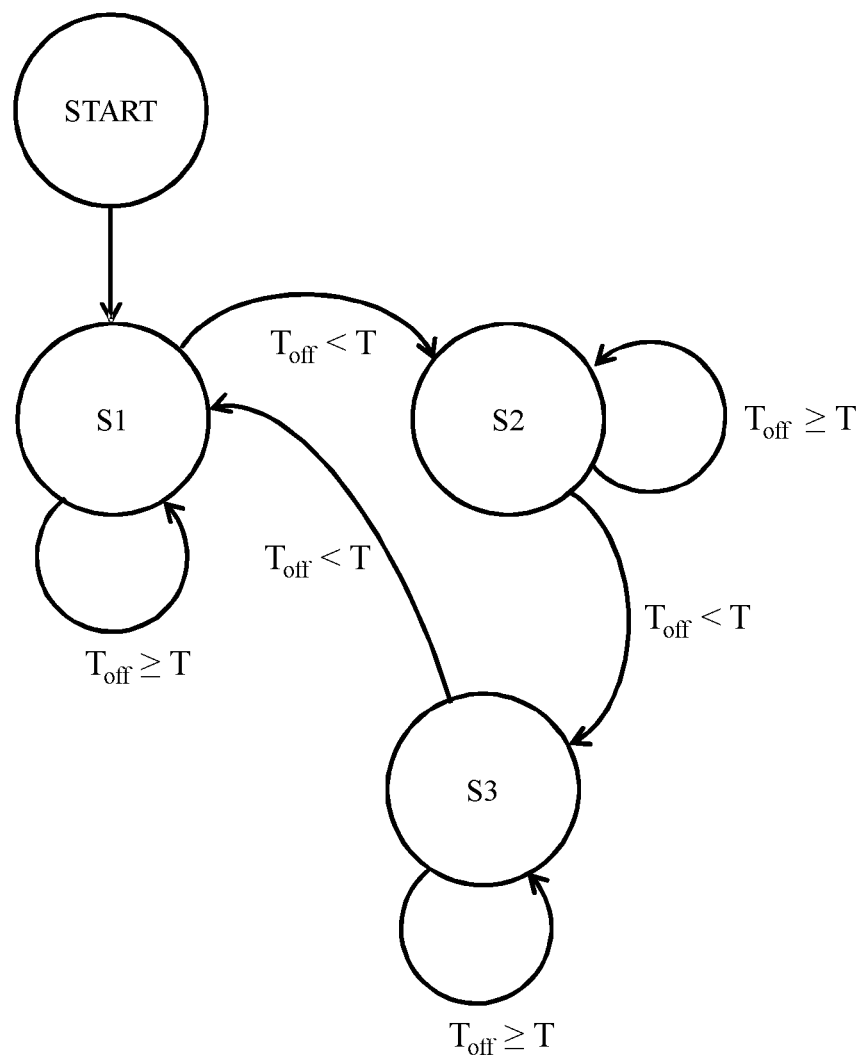
FIG. 6 schematically depicts a finite state machine implemented by a controller of a lighting device according to an embodiment.

The controller 100, e.g. the CPU 110, is further responsive to the further controller 30, e.g. a wall switch or the like, such that a user of the further controller 30 may specify a dimming level of the lighting device 10 with a defined sequence of on/off actions with the further controller 30, i.e. a defined sequence of switching off and on the further controller 30 to select a dimming level of the light device 10. This is explained in further detail with the aid of FIG. 6, which depicts an example finite state machine implemented by the controller 100, e.g. the CPU 110, in which the different states S1, S2, S3 depict different dimming levels of the lighting device 10. For example, state S1 may define a minimal dimming level of the lighting device 10 (e.g. light intensity ~100%), state S2 may define an intermediate dimming level of the lighting device 10 (e.g. light intensity ~40%) and state S3 may define a maximum dimming level of the lighting device 10 (e.g. light intensity ~10%). It should be understood that the aforementioned dimming levels are by way of non-limiting example only and that the finite state machine may comprise any suitable number of states representing different dimming levels, with each state defining any suitable dimming level of the lighting device 10.

A user may trigger a state change of the finite state machine by first switching off the further controller 30, thereby disrupting the power supply to the lighting device 10, which may be detected by the further communication module 15, causing the activation of the timer 150 or the real time clock 160, e.g. by the further communication module 15 or the CPU 110. The timer 150 or the real time clock 160 determines the duration of the power supply disruption, i.e. the period of time $T_{off}$ between the user switching off the further controller 30 and switching the further controller 30 back on. If the duration $T_{off}$ of this disruption is less than a defined threshold T, e.g. less than 3 seconds by way of non-limiting example, the off/on sequence of the further controller 30 is interpreted as a further dimming instruction by the controller 100, which triggers a change in the state of the finite state machine, e.g. a transition S1→S2, a transition S2→S3 or a transition S3→S1 in the circular finite state machine in FIG. 6. On the other hand, if the controller 100, e.g. the CPU 110, determines that the duration $T_{off}$ exceeds the defined threshold T, e.g. $T_{off} \geq 3$ s, this is interpreted as the user simply wishing to switch off the lighting device 10, i.e. not wishing to provide a further dimming instruction, such that the finite state machine implemented by the controller 100, e.g. by the CPU 110, remains in its actual state, i.e. does not change the actual dimming level, e.g. the previously stored dimming level, of the lighting device 10.

Figure 7:
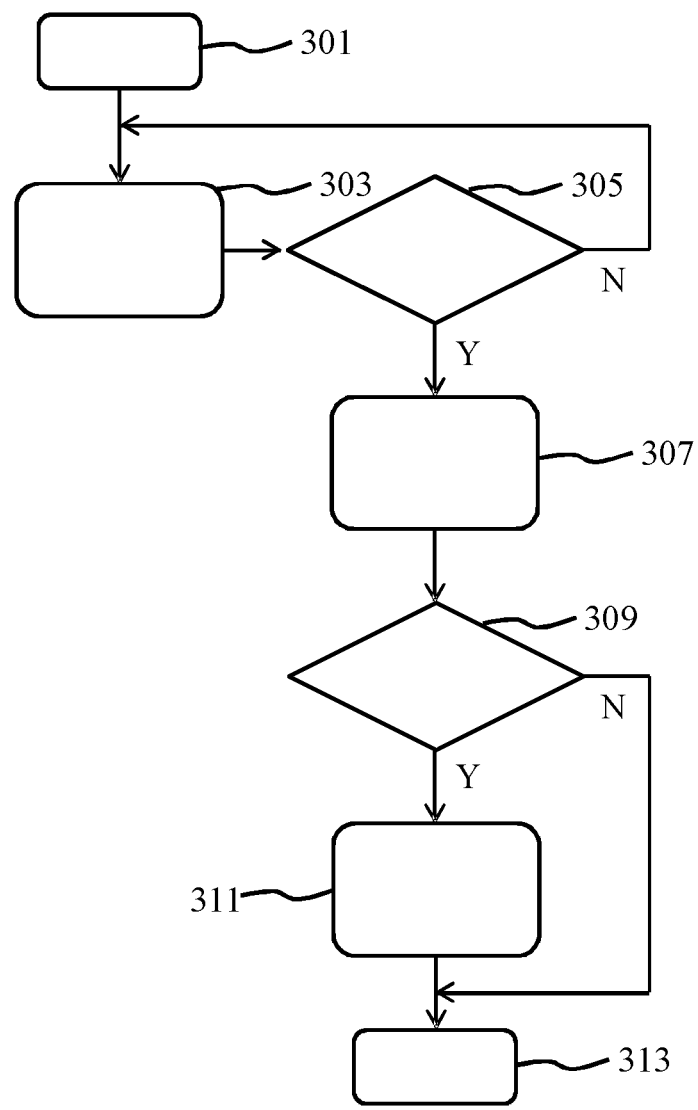
FIG. 7 is a flowchart of a control method of a lighting device according to an embodiment based on the finite state machine of FIG. 6.

This is further explained with the aid of FIG. 7, which schematically depicts a control method 300 implemented by the controller 100 in response to control signals provided with the further controller 30. The control method 300 starts in 301, e.g. by the lighting device 10 being switched on, which triggers the controller 100 to retrieve the most recently stored specified dimming level from the memory device 120 and configure the driver circuit 130 in accordance with the retrieved most recent dimming level of the lighting device 10.

Next, the controller 100 keeps controlling the lighting device 10 in accordance with this retrieved dimming level until a power down signal is detected by the further communication module 15, e.g. on a GPIO pin of this module, in 305, after which the control method 300 proceeds to 307 in which the duration $T_{off}$ of the power supply disruption is timed with the timer 150 or the real time clock 160 as previously explained. This duration may be lazily determined in some embodiments; specifically, as soon as the duration $T_{off}$ exceeds the defined threshold T, the controller 100 may terminate the timing process, e.g. to save power, as it is clear that the power down of the lighting device 10 with the further controller 30 is not intended as a further dimming instruction.

Whether the duration $T_{off}$ is intended as a further dimming instruction may be checked by the controller 100 in 309, in which $T_{off}$ is compared against defined threshold T as previously explained. If it is decided in 309 that $T_{off} < T$, the controller 100 advances the finite state machine of FIG. 6 to the next state and updates the memory device 120 accordingly in 311, i.e. stores the dimming level of the state to which the finite state machine has advanced in the memory device 120. This may involve temporarily storing the dimming level as specified in this state into the Flash memory 145 and transferring the dimming level from the Flash memory 145 to the main memory device 120 upon the controller 100 exiting a sleep mode, as will be explained in further detail below.

The controller 100 at this point may further communicate the new dimming level to the wireless controller 20 using the wireless communication module 16 such that dimming level information on the wireless controller, e.g. dimming level indicator 25 on control 23, may be adjusted in accordance with this dimming level information update, such that the wireless controller 20 remains synchronized with the lighting device 10. The controller 100 subsequently controls the lighting device 10 in accordance with the dimming level associated with the state of the finite state machine to which the finite state machine has advanced as previously explained, i.e. by controlling the driver circuit 130 in accordance with the updated specified dimming instructions before terminating in 313. On the other hand, if it is decided in 309 that $T_{off} \geq T$, the controller 100 may conclude that the disruption of the power supply with the further controller 30 was not intended as a further dimming instruction such that no update of the dimming information in the memory device 120 is required. Consequently, the control method 300 in this scenario may skip 311 and terminate in 313 such that next time the lighting device 10 is powered up, e.g. with the further controller 30, the lighting device 10 is configured in accordance with the specified dimming level as previously stored in the memory device 120.

At this point, it is noted that the above described finite state machine-based dimming level setting using a sequence of off/on switched signals may equally be provided with the wireless controller 20. For example, the on/off switch 27 of the wireless controller 20 may be used to provide such a sequence of off/on signals to force the finite state machine as implemented by the controller 100, e.g. the CPU 110, into different states associated with different dimming levels as explained above. The on/off switch 27 in an embodiment may be configured to enable/disable the wireless communication channel between the lighting device 10 and the wireless controller 20, such that in this embodiment the time period $T_{off}$ corresponds to the duration of the disruption of the wireless communication (channel) between the lighting device 10 and the wireless controller 20.

At this point, it is noted that a continuous or more fine-grained dimming of the light engine 12 with the wireless controller 20 may bring the above described finite state machine in an undefined state, e.g. at a dimming level value not associated with any of the states of the finite state machine. To this end, the controller 100 may be adapted to convert such a dimming level value into a dimming level value defined by a state of the finite state machine. For example, in a scenario where the actual dimming level value was set to 50% with the wireless controller 20 and the finite state machine specifies dimming level values of 100%, 40% and 10%, the controller 100 may convert the actual dimming level value, e.g. by rounding down or up the dimming level value to the dimming level value associated with the next defined state of the finite state machine or by finding the nearest defined dimming level state of the finite state machine (here the state associated with the dimming level value of 40%). This conversion for instance may be made once the controller 100 requires the finite state machine to be in a defined state, for example when receiving a dimming instruction from the further controller 30 triggering a state change of the finite state machine.

In an embodiment where the power supply is disrupted with the further controller 30, e.g. a wall switch or the like wired to the lighting device 10, the controller 100 must be able to perform the aforementioned evaluation of the duration of the disruption of the power supply (i.e. $T_{off}$) to determine if this duration corresponds to a further dimming instruction, (i.e. $T_{off}$<T). As previously explained, the lighting device 10 may comprise an electric charge storage device such as a capacitor or small battery, which electric charge storage device is typically arranged such that it is charged when the lighting device 10 is connected to the power supply and powers the lighting device 10 including the controller 100 upon the lighting device 10 being disconnected from the power supply. However, as will be appreciated by the skilled person, the lighting device 10 may comprise several components that will dissipate relatively large amounts of electric charge, such that the electric charge storage device may be depleted before the evaluation of the duration of the disruption of the power supply has been completed.

Therefore, in an embodiment, the controller 100 is adapted to enter a sleep mode upon an instruction from a user, or upon a disruption of wireless connection to the wireless controller or a disruption of a power supply. In the sleep mode of the controller, non-essential components of the controller can be disabled. At the same time, the wireless communication module 16 and/or the further communication module 15 can be disabled to save power. For example, a user may input an instruction by a smart device to make the controller enter a sleep mode, and further disable the wireless communication module 16 and/or the further communication module 15. Further the user can set or define the sleep mode for the controller 110 in advance, that is the controller 110 is adapted to enter a sleep mode while the power supply is lost, or the wireless connection to the wireless controller 20 is lost.

Figure 8:
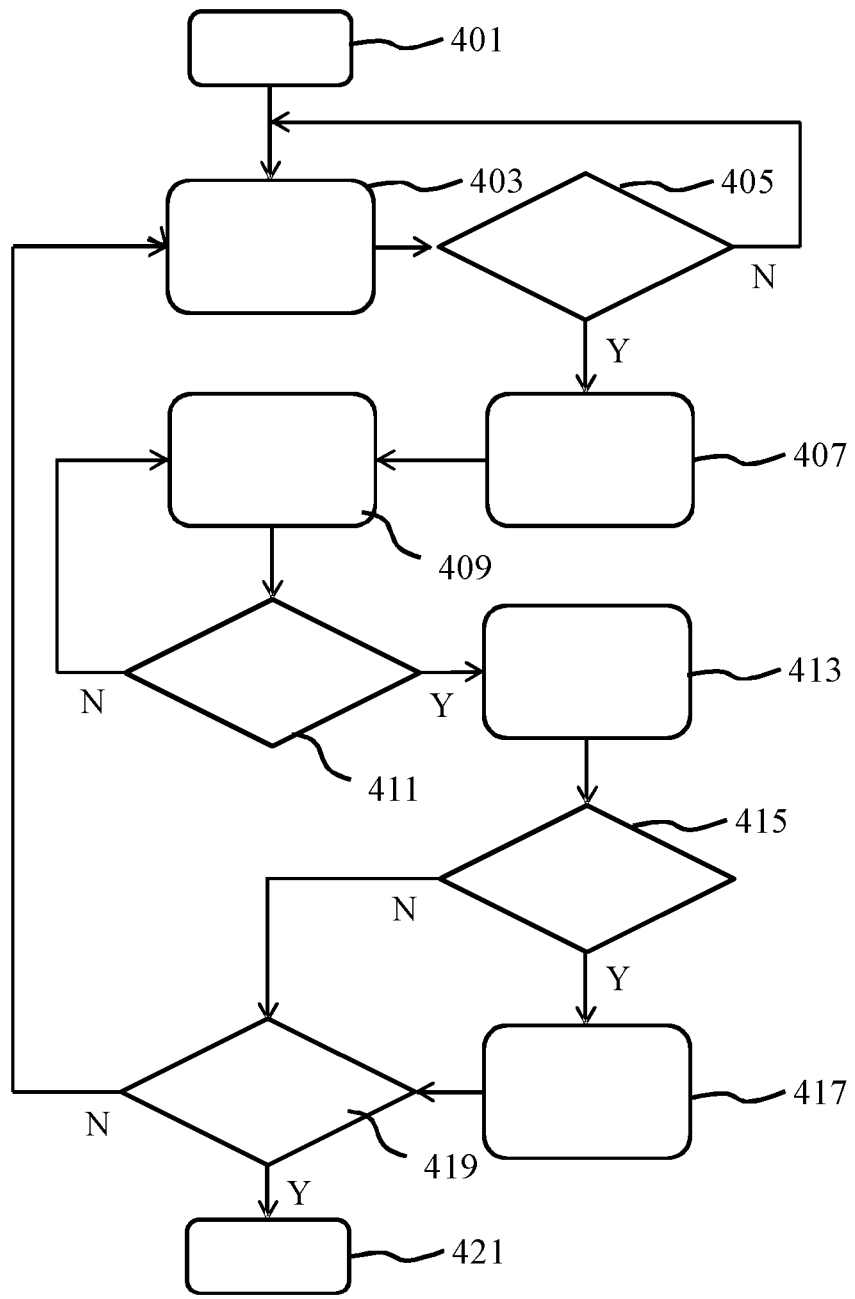
FIG. 8 is a flowchart of another control method of a lighting device according to an embodiment based on the finite state machine of FIG. 6.

Therefore, in an embodiment, the controller 100 is adapted to enter a sleep mode powered by the electric charge storage device in response to a loss of a power supply to the lighting device 10 detected with the previously mentioned power supply detector. This will be explained in more detail with the aid of FIG. 8, which is a flowchart of a power saving method implemented by the controller 100 including such a sleep mode. The power saving method 400 starts in 401, for example with the powering up of the lighting device 10, which triggers the controller to retrieve the previously stored dimming level from the memory device 120 and operate the light engine 12 in accordance with the retrieved dimming level as previously explained. The method 400 subsequently proceeds to 405, in which the controller 100 checks using the power supply detector if the power supply to the lighting device 10 is disrupted, e.g. with the further controller 30. If this is not the case, the method 400 reverts back to 403 in which the operation of the lighting device in accordance with the retrieved dimming level is continued.

However, if a power supply disruption is detected in 405, the method 400 proceeds to 407 in which the controller 100 enters a sleep mode by disabling non-essential components of the lighting device 10, i.e. components that are not required to determine the duration of the disruption to the power supply. For example, the controller 100 may disable the wireless communication module 16 and the further communication module 15 to save power. In addition, the controller 100 may switch off the light engine 12, for example by minimizing the duty cycle of the PWM control signal applied by the driver circuit 130. Also, the controller 100 may disable peripheral components of the CPU 100 to further save energy. Other examples of other suitable components that may be temporarily disabled in this manner will be immediately apparent to the skilled person.

In an embodiment, the timer 150 or the real time clock 160 may continue to operate in the sleep mode, for example to determine duration $T_{off}$ in 409, whilst the CPU 110 is placed in a sleep mode, i.e. does not execute instructions. Next, it is checked in 411 if the power supply to the lighting device 10 has been restored, e.g. by detecting the presence of a power supply on a GPIO pin of the power supply detector as previously explained. If this is not the case, the controller 100 may continue to determine the duration of the power supply disruption in 409. On the other hand, if restoration of the power supply is detected, the method 400 may proceed to 413 in which the power supply is restored. This may involve checking if the CPU 110 is still responsive, i.e. the electric charge storage device did not run out of so much power that the CPU 110 could no longer be provided with nominal power supply levels. In case of an unresponsive CPU 110, exiting this sleep mode may include rebooting the CPU 110 in order to bring the CPU 110 in a well-defined (operational) state. From this well-defined state, the CPU 110 may follow a defined procedure in which the previously disabled components of the controller 100, e.g. the wireless communication module 16 and the further communication module 15 are restored in any suitable manner and sequence.

Next, the method 400 proceeds to 415 in which the CPU 110 checks if the duration of the disruption to the power supply as measured in 409 corresponded to a further dimming instruction, i.e. $T_{off}$<T. If this is the case, the CPU 110 in 417 advances the finance state machine to the appropriate state, stores the corresponding dimming level in the memory device 120 and operates the light engine 12 in accordance with this new dimming level as previously explained. However, if the CPU 110 determines that $T_{off}$≥T, no further dimming instruction has been received such that 417 may be skipped and it may be decided in 419 that the lighting device 10 should be operated in accordance with the most recently stored dimming level in the memory device 120, such that the method 400 may revert back to 403. Alternatively, it may be decided in 419 that the method 400 should terminate, in which case the method 400 may end in 421.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A lighting device comprising:
 a light engine comprising at least one solid state lighting element;
 a controller for controlling a dimming level of the light engine;
 a wireless communication module communicatively coupled to the controller for receiving a wireless dimming instruction from a wireless controller;
 a further communication module communicatively coupled to the controller for connecting to a wired communication channel and for receiving a further dimming instruction from a further controller wired to the further communication module through the wired communication channel;
a memory device, and
a timer for timing a duration of a disruption, wherein the controller is adapted to store a specified dimming level in the memory device when said timed duration does not exceed the disruption threshold and retain a previously stored specified dimming level when said timed duration exceeds the disruption threshold;
wherein the controller is adapted to independently control the dimming level of the light engine in response to the wireless dimming instruction and the further dimming instruction;
wherein the controller is adapted to enter a sleep mode in response to a sleep mode instruction, in said sleep mode, at least the wireless communication module disabled.

2. The lighting device of claim 1, said sleep mode instruction is an instruction from a user or a disruption, said disruption being one of a disruption of wireless connection to the wireless controller and a disruption of a power supply.

3. The lighting device of claim 1, wherein the lighting device further comprising an electric charge storage device and a power supply detector arranged to be coupled to a power supply,
wherein the controller is adapted to enter a sleep mode powered by the electric charge storage device in response to a loss of a power supply to the lighting device detected with the power supply detector, in said sleep mode, at least the wireless communication module is disabled.

4. The lighting device of claim 3, wherein the electric charge storage device comprises a capacitor.

5. The lighting device of claim 1, wherein the specified dimming level is based on the wireless dimming instruction received from the wireless controller or on the further dimming instruction received from the further controller.

6. The lighting device of claim 5, wherein the controller is adapted to store the specified dimming level in the memory device in response to said disruption, said disruption being one of a disruption of wireless connection to the wireless controller and a disruption of a power supply.

7. The lighting device of claim 6, wherein the controller is adapted to store an actual dimming level as the specified dimming level in the memory device in response to said disruption.

8. The lighting device of claim 5, wherein the controller is further adapted to restore the specified dimming level stored in said memory device upon restoration of said wireless connection or power supply.

9. The lighting device of claim 1, wherein the controller is further adapted to, in response to receiving the further dimming instruction from the further controller, control the wireless communication module to send a synchronization instruction to the wireless controller for synchronizing dimming level information on said wireless controller with the specified dimming level set in accordance with the received further dimming instruction.

10. The lighting device of claim 1, wherein the controller is adapted to exit said sleep mode in response to an instruction from a user or a restoration of a disruption, said restoration of the disruption being one of a restoration of wireless connection to the wireless controller and a restoration of the power supply to the lighting device.

11. The lighting device of claim 1, wherein the lighting device is a light bulb.

12. A lighting device comprising:
a light engine comprising at least one solid state lighting element;
a controller for controlling a dimming level of the light engine;
a wireless communication module communicatively coupled to the controller for receiving a wireless dimming instruction from a wireless controller;
a further communication module communicatively coupled to the controller for connecting to a wired communication channel and for receiving a further dimming instruction from a further controller wired to the further communication module through the wired communication channel;
wherein the controller is adapted to independently control the dimming level of the light engine in response to the wireless dimming instruction and the further dimming instruction;
wherein the controller is adapted to enter a sleep mode in response to a sleep mode instruction, in said sleep mode, at least the wireless communication module disabled;
wherein the controller is adapted to store a specified dimming level in the memory device;
wherein the specified dimming level is based on a wireless dimming instruction received from the wireless controller or on a further dimming instruction received from the further controller;
wherein the controller is adapted to store the specified dimming level in the memory device in response to said disruption, said disruption being one of a disruption of wireless connection to the wireless controller and a disruption of a power supply;
wherein the controller is adapted to store an actual dimming level as the specified dimming level in the memory device in response to said disruption; and
wherein when a disruption in the wireless connection to the wireless controller occurs, the controller is adapted to alter an actual dimming level at the time of the disruption to the wireless connection in a defined manner to obtain the specified dimming level.

13. A lighting device comprising:
a light engine comprising at least one solid state lighting element;
a controller for controlling a dimming level of the light engine;
a wireless communication module communicatively coupled to the controller for receiving a wireless dimming instruction from a wireless controller;
a further communication module communicatively coupled to the controller for connecting to a wired communication channel and for receiving a further dimming instruction from a further controller wired to the further communication module through the wired communication channel;
wherein the controller is adapted to independently control the dimming level of the light engine in response to the wireless dimming instruction and the further dimming instruction;
wherein the controller is adapted to enter a sleep mode in response to a sleep mode instruction, in said sleep mode, at least the wireless communication module disabled;
wherein the controller is adapted to store a specified dimming level in the memory device;
wherein the specified dimming level is based on a wireless dimming instruction received from the wireless controller or on a further dimming instruction received from the further controller;

wherein the controller is adapted to store the specified dimming level in the memory device in response to said disruption, said disruption being one of a disruption of wireless connection to the wireless controller and a disruption of a power supply;

wherein the controller is adapted to store an actual dimming level as the specified dimming level in the memory device in response to said disruption;

wherein the controller is adapted to store an actual dimming level as the specified dimming level in the memory device in response to said disruption; and wherein when a disruption to the power supply occurs, the controller is adapted to alter an actual dimming level at the time of the disruption to the power supply in a defined manner to obtain the specified dimming level.

* * * * *